C. STONEY.
AUTOMATIC FLOOR SCRUBBING MACHINE.
APPLICATION FILED JULY 24, 1919.
1,333,226.
Patented Mar. 9, 1920.
2 SHEETS—SHEET 1.
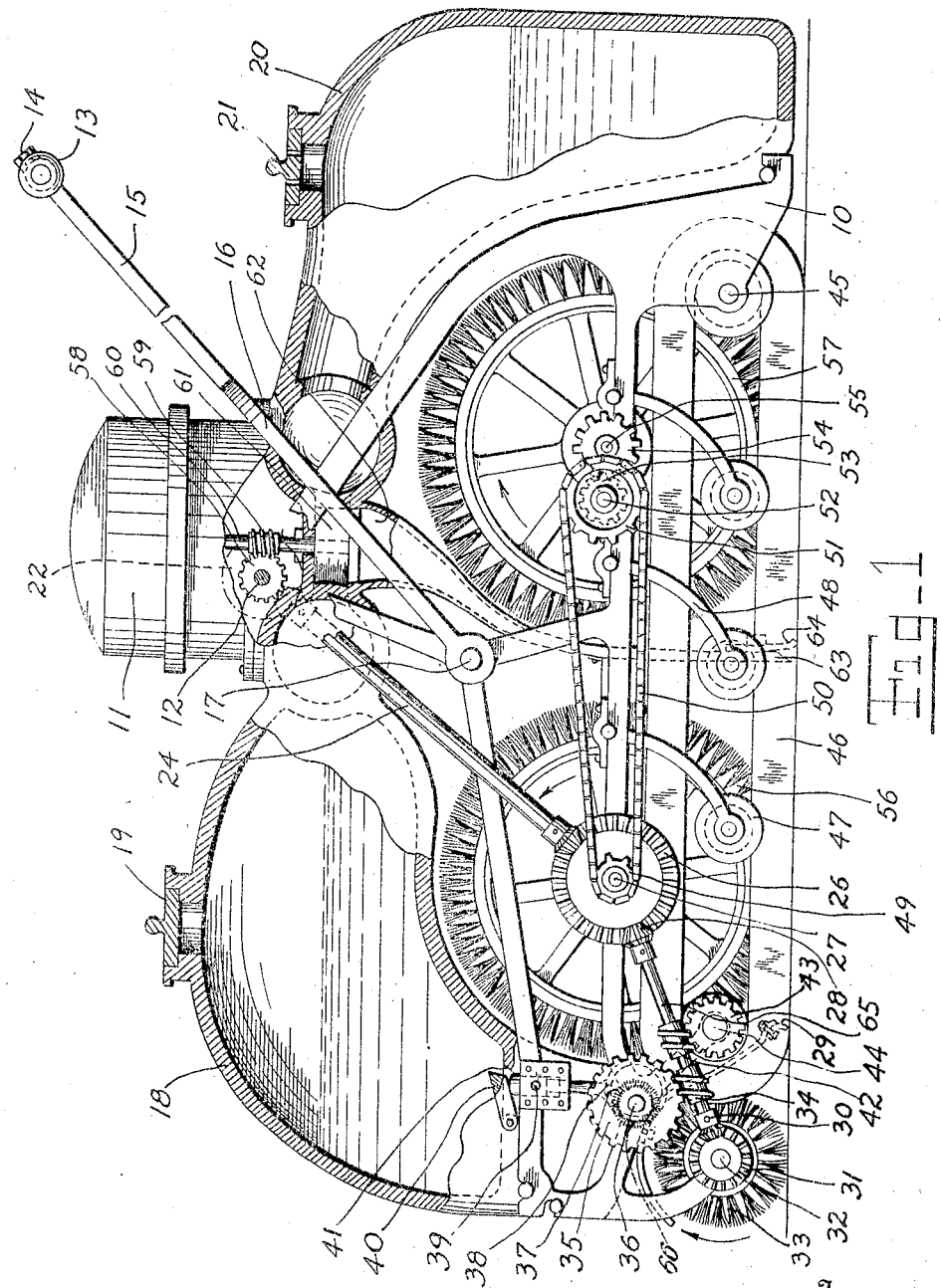
Inventor
Casimir Stoney
By Alfred Tschinkel
Attorney

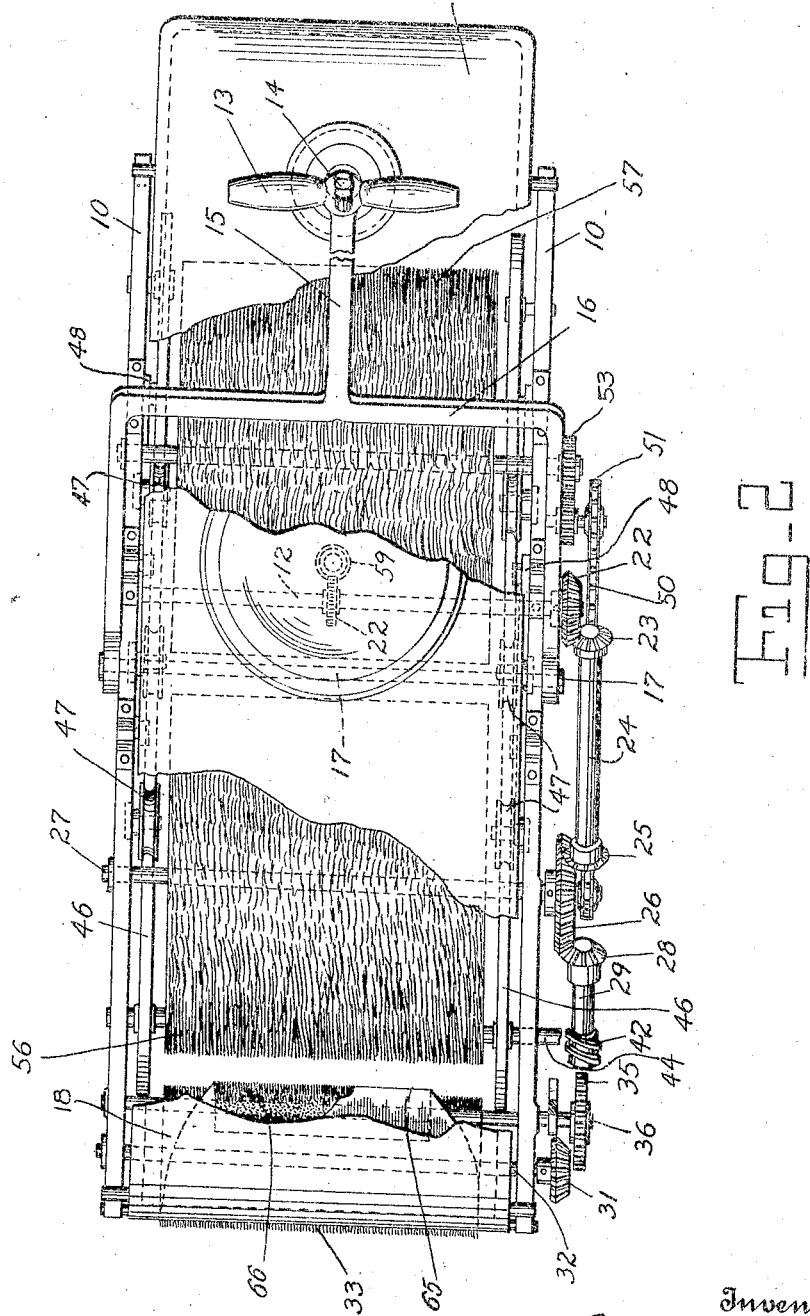

UNITED STATES PATENT OFFICE.

CASIMIR STONEY, OF MONTREAL, QUEBEC, CANADA.

AUTOMATIC FLOOR-SCRUBBING MACHINE.

1,333,226.    Specification of Letters Patent.    Patented Mar. 9, 1920.

Application filed July 24, 1919. Serial No. 312,949.

*To all whom it may concern:*

Be it known that I, CASIMIR STONEY, a citizen of Russia, residing at Montreal, Province of Quebec, and Dominion of Canada, have invented certain new and useful Improvements in Automatic Floor-Scrubbing Machines, of which the following is a specification.

This invention has as its object the provision of an electrically operated machine for thoroughly scrubbing and cleansing floors.

A further object is to provide means whereby the current to the motor may be controlled in a convenient manner by the operator.

Another object is to provide means whereby the water used in the scrubbing operation is prevented from flowing laterally from the machine during its operation.

A still further object is to provide means whereby clean water is automatically supplied in proper quantities without volition on part of the operator, the used water being recovered and retained within a tank carried by the apparatus.

These and other like objects are attained by the novel construction and combination of parts hereinafter described and shown in the accompanying drawings, forming a material part of this disclosure, and in which:—

Figure 1 is a side elevational view showing a scrubbing machine made in accordance with the invention, portions being broken away in order to disclose the relation of parts used therein, and Fig. 2 is a top plan view of the same, parts also being broken away in order to disclose the interior construction.

Referring to the drawings in detail, the numeral 10 designates a pair of side frames, respectively right and left, these frames supporting at their top, near the center, a circular monitor casing 11, containing an electric motor having a transversely extending shaft 12.

A T shaped operating handle 13 is provided with an electrical switch 14 by which the electrical current is controlled to the motor, the handle extending across the end of a bar 15, merging into forks 16 which are pivoted upon a shaft 17, passing transversely in the frame 10.

Carried on the frame, at the front end of the mechanism, is a supply tank 18 having a removable cover 19 through which fresh water may be supplied, while at the opposite end of the machine is another tank 20, having a perforate cover 21, the tank being adapted to receive the refuse water, as will be further on described.

Fixed upon one end of the shaft 12 is a bevel gear 22, driving a pinion 23 on the end of a diagonally disposed shaft 24, having on its lower end another bevel pinion 25, meshing with a bevel gear 26, mounted on a shaft 27, extending transversely through the machine, the gear 26 communicating rotary motion to a pinion 28, on another diagonally disposed shaft 29, having at its lower end a bevel pinion 30, driving a bevel gear 31, on the end of a shaft 32, extending transversely through the frame at the lower front portion thereof, and on which is mounted a cylindrical sweeping brush 33 adapted to remove loose accumulations from the floor.

Fixed upon the diagonal shaft 29 is a worm 34, driving a gear 35, mounted on a shaft 36, and secured to the back side of the gear 35 is an eccentric 37 encircled by an eccentric ring 38 from which extends a stem 39, in a bearing pivoted on the frame, its upper end making contact with a clapper valve 40, controlling the opening 41 leading from the tank 18 downward at its lower portion so that when the valve 40 is raised clean water is permitted to pass out.

Another worm 42 is secured upon the shaft 29, meshing with a gear 34, fixed upon a transverse shaft 44, a similar shaft 45 being at the rear end of the machine, these shafts carrying rollers over which are trained endless wipers or mops 46, arranged to present a relatively narrow edge upon the surface so as to prevent the water from running sidewise on the floor from between the frame sides, and in order to hold the endless wipers 46 downward upon the surface of the floor, a plurality of rollers 47 are mounted in arms 48, pivoted at their upper ends in the frame 10.

Secured on the shaft 27 is a sprocket 49 over which is trained a chain 50, running over another sprocket 51, mounted on a stub shaft 52 near the rear of the machine, alongside of which is a spur pinion 53, engaging with a gear 54, fixed on a shaft 55, mounted transversely in the frame.

Fixed upon the shaft 27, between the frame sides is a relatively large cylindrical brush 56, rotatable in a counter clock-wise direction, while a similar cylindrical brush 57 is secured upon the shaft 55 which obviously by the intermediate gearing is caused to rotate in an opposite direction.

Secured upon the shaft 12 is a gear 58 adapted to drive a worm 59, fixed upon a vertical spindle 60, the spindle having on its lower end the vanes of a rotary pump 61 immediately below the housing 11 and from which broadened to extend from side to side of the machine, and is held closely adjacent to a wiper element 64, resting upon the floor surface, the suction head 63 extending completely across the apparatus, so as to gather up any accumulation of water which is conveyed upward and eventually into the used water tank 20.

A soap reservoir 65 is arranged at the front of the apparatus, the same having a narrowed inner portion in which rotates a cylindrical brush 66 centered on the revolving shaft 36, so that soap in a cake or in powdered form may be dispensed in the path of water from the tank 18 when the clapper valve 40 is raised.

The mounting of the tanks 18 and 20 are such that they may be disassociated from the frame at any desired time, as for cleansing or other purposes, and the electric current supplied from any convenient source.

In operation, the parts having been assembled as indicated and the supply tank 18 filled with clean water, the machine is advanced over the surface to be cleansed, whereupon the brush 23 gathers the larger particles, prior to the wetting of the surface, which is accomplished automatically by intermittently raising the valve 40 through the cam or eccentric employed, delivering a stream of water in advance of the distributing plates 65 at the front of the machine, the scrubbing being principally accomplished by the revolving brush 56, after which the excess of water is removed by the rotary pump from the floor, which is finally polished and cleansed by the brush 57, the wiping elements 46 preventing the water from spreading beyond the path of the machine upon the floor.

Having thus described my invention what I claim as new and desire to secure by Letters Patent, is—

1. In an automatic floor scrubbing machine, the combination with a pair of side frames, and a supply tank arranged at the front of said machine, of a motor mounted centrally on said frame, a sweeping brush, a scrubbing brush, means for automatically dispensing water in advance of said scrubbing brush from said supply tank, a wiping brush, said scrubbing and wiping brushes being rotated in opposite directions, and means for retaining water between the frames of said machine.

2. In a floor cleaning machine, the combination with a pair of side frames, a supply and receiving tank removably engaged respectively at the front and rear of said frame, an electric motor carried on said frame, and means for propelling said apparatus, a sweeping brush at the front of said frame, a rotary scrubbing brush, a valve in said supply tank adapted to be operated for automatically dispensing water in advance of said scrubbing brush, suction means in said frame for gathering up any accumulation of water, a wiping brush rotated oppositely to said scrubbing brush, and a pair of endless traveling wipers arranged at the sides of the frame adapted to prevent the passage of water therebetween.

In testimony whereof I have affixed my signature.

CASIMIR STONEY.